United States Patent
Iimura

(10) Patent No.: US 7,307,936 B2
(45) Date of Patent: Dec. 11, 2007

(54) DISK DRIVE DEVICE AND ADDRESS DETECTION METHOD WITH BINARIZED PUSH-PULL SIGNAL

(75) Inventor: Shinichiro Iimura, Tokyo (JP)

(73) Assignee: Sony Corporation, Tokyo (JP)

( * ) Notice: Subject to any disclaimer, the term of this patent is extended or adjusted under 35 U.S.C. 154(b) by 426 days.

(21) Appl. No.: 10/492,286

(22) PCT Filed: Aug. 12, 2003

(86) PCT No.: PCT/JP03/10264

§ 371 (c)(1),
(2), (4) Date: Apr. 9, 2004

(87) PCT Pub. No.: WO2004/015698

PCT Pub. Date: Feb. 19, 2004

(65) Prior Publication Data

US 2005/0007928 A1    Jan. 13, 2005

(30) Foreign Application Priority Data

Aug. 12, 2002 (JP) ............................. 2002-234739

(51) Int. Cl.
*G11B 5/09* (2006.01)
(52) U.S. Cl. ................. 369/59.21; 369/47.27; 369/124.05
(58) Field of Classification Search ............ 369/59.21, 369/47.27, 124.05; *G11B 5/09*
See application file for complete search history.

(56) References Cited

U.S. PATENT DOCUMENTS 4,838,662 A * 6/1989 Hilsum et al. ............... 349/164
6,519,214 B1   2/2003 Hikima
6,801,488 B2 * 10/2004 Kato et al. ............... 369/47.28
2002/0036967 A1   3/2002 Osada

FOREIGN PATENT DOCUMENTS

| EP | 1 223 582 A2 | 7/2002 |
|----|--------------|--------|
| JP | 2000-113463 | 4/2000 |
| JP | 2001-266356 | 9/2001 |
| JP | 2001-312823 | 11/2001 |

OTHER PUBLICATIONS

Patent Abstracts of Japan, JP 2000-113463, Apr. 21, 2000 (corr. US 6,519,214 B1).

* cited by examiner

*Primary Examiner*—A M Psitos
(74) *Attorney, Agent, or Firm*—Oblon, Spivak, McClelland, Maier & Neustadt, P.C.

(57) ABSTRACT

A disk drive device capable of satisfactorily detecting address information recorded by land prepits even after data is recorded is provided. When address information recorded by land prepits is detected from a disk on which lands and grooves as recording tracks are formed and address information is recorded as land prepits on the lands, a window signal is generated by binarizing a push-pull signal (window generation circuit 31), the push-pull signal is integrated in a period based on the window signal (integration circuit 32), and the address information by the land prepits is extracted from the integrated signal (33, 34, 35, and 26).

3 Claims, 6 Drawing Sheets

FIG. 6

|         | b2 | b1 | b0 |
|---------|----|----|----|
| DATA = 1 | 1  | 0  | 1  |
| DATA = 0 | 1  | 0  | 0  |

DISK DRIVE DEVICE AND ADDRESS DETECTION METHOD WITH BINARIZED PUSH-PULL SIGNAL

TECHNICAL FIELD

The present invention relates to a disk drive device for performing recording and playback to and from a disk recording medium such as an optical disk, and to an address detection method therefor.

BACKGROUND ART

In order to record data on a disk, means for performing guidance for forming data tracks becomes necessary. For this reason, it has been practiced that grooves are formed in advance as pregrooves, and the grooves or lands (parts whose cross sections are shaped as a plateau, sandwiched between grooves) are used as data tracks.

Also, there is a need to record address information so that data can be recorded at a predetermined position on the data tracks. This address information is recorded by causing grooves to wobble (meander) or by forming prepits on the data tracks.

For example, among DVDs (Digital Versatile Discs), in DVD-RWs, which are rewritable disks using a phase change recording method, and DVD-Rs, which are recordable disks using an organic pigment change method, as shown in FIG. 4, wobbling grooves G are formed as preformats on the disk, and also, land prepits LPP are formed in the lands L portions between the grooves G and G.

In this case, reflected light information obtained by the wobbling grooves is used for controlling the rotation of the disk and generating a recording master lock. Furthermore, land prepits are used to determine accurate recording positions in bit units and to obtain various kinds of information of the disk, such as preaddresses. That is, the addresses indicating the physical position on the disk are recorded as land prepits LPP.

In a disk drive device compatible with such a disk, by reading an address recorded as land prepits LPP on the disk during playback or recording, the position on the disk during recording or playback is confirmed, and various kinds of control are performed.

However, after information is recorded in the grooves, which are recording tracks, the land prepits LPP become difficult to read as a result of interference by pits (phase change pits, etc.) formed in the grooves. Furthermore, the land prepits LPP of the disk after information is recorded become difficult to read depending on the status of an optical pickup (recording/playback head), for example, variation of the position of the photodetector for detecting reflected light, and various kinds of aberrations.

FIGS. 5A to 5C show a read waveform corresponding to land prepits LPP. FIG. 6 shows data recorded by land prepits LPP.

The land prepits LPP, as shown in FIG. 4, are formed by cutouts in the lands in synchronization with the wobble, and three land prepits LPP represent one bit of the address data. That is, as in FIG. 6, if b2, b1, and b0 as (the presence or absence of) the three land prepits LPP are "1, 0, 1", this is assumed to represent "1", and if "1, 0, 0", this is assumed to represent "0".

The information of such land prepits LPP can be obtained as reflected light information from the disk in accordance with a so-called push-pull signal. That is, this information is difference information of the amounts of reflected light on the right and left with respect to the direction of the track lines.

In this push-pull signal, as shown in FIG. 5A, a comparatively large amplitude is obtained in such a manner as to correspond to the land prepits LPP, and by detecting this amplitude, the information of the land prepits LPP can be detected. For example, the binarization of that information using, for example, a predetermined threshold level makes it possible to detect "1" or "0" as b2, b1, and b0 of the land prepits LPP.

Here, in the case of a state in which data is not recorded on the groove tracks, the amplitude waveform formed by the land prepits LPP becomes a sharp waveform, as shown in FIG. 5B in such a manner as to be expanded in the direction of the time axis, that is, a waveform in which the eye is open satisfactorily. Therefore, the land prepits LPP information can be extracted properly.

However, when data is recorded in the groove tracks, as shown in FIG. 5C, the eye pattern waveform blurs, and the detection of "1" or "0" as b2, b1, and b0 of the land prepits LPP becomes difficult. As a result, the address error rate is deteriorated.

The fact that, after the data is recorded, the address reading by the land prepits LPP becomes difficult in this manner means that, for example, when additional recording is performed on a disk after recording or when a seek is performed, the address cannot be obtained satisfactorily, and the operation performance decreases.

In order to avoid this situation, incorporation of a pickup in good condition with high accuracy has been considered. In that case, selection of the pickup to be incorporated and use of an expensive pickup with high accuracy become necessary, resulting in an undesirable cost increase of the disk drive device.

DISCLOSURE OF INVENTION

In view of such circumstances, an object of the present invention is to be capable of satisfactorily detecting address information by land prepits even after data is recorded in a disk drive device.

To this end, in one aspect, the present invention provides a disk drive device including: head means for performing laser output for the purpose of recording or playing back data to or from a disk-shaped recording medium on which grooves are formed as recording tracks and address information is recorded by prepits on lands between the grooves; push-pull signal generation means for generating a push-pull signal from reflected light information detected by the head means; window generation means for generating a window signal by binarizing the push-pull signal; integration means for integrating the push-pull signal in a period based on the window signal; and extraction means for extracting address information recorded by the prepits from the output of the integration means.

In another aspect, the present invention provides an address detection method for detecting address information recorded by prepits with respect to a disk-shaped recording medium on which grooves are formed as recording tracks and address information is recorded by the prepits on lands between grooves, the address detection method including the steps of: generating a push-pull signal from reflected light information when laser radiation is performed on the disk-shaped recording medium; generating a window signal by binarizing the push-pull signal; integrating the push-pull signal in a period based on the window signal; and extracting address information recorded by the prepits from the integrated signal.

According to the present invention described above, a push-pull signal is integrated in a period in which land prepits are detected by a window signal, and the land prepit signal is detected from the integrated result. In this case, the integration of the push-pull signal makes it possible to obtain a sharp waveform corresponding to the land prepit.

BRIEF DESCRIPTION OF THE DRAWINGS

FIG. 6 is an illustration of a data pattern of land prepits.

BEST MODE FOR CARRYING OUT THE INVENTION

An embodiment of the present invention will be described below by using as an example a disk drive device (recording/playback device) compatible with DVD-Rs and DVD-RWs.

Figure 1:
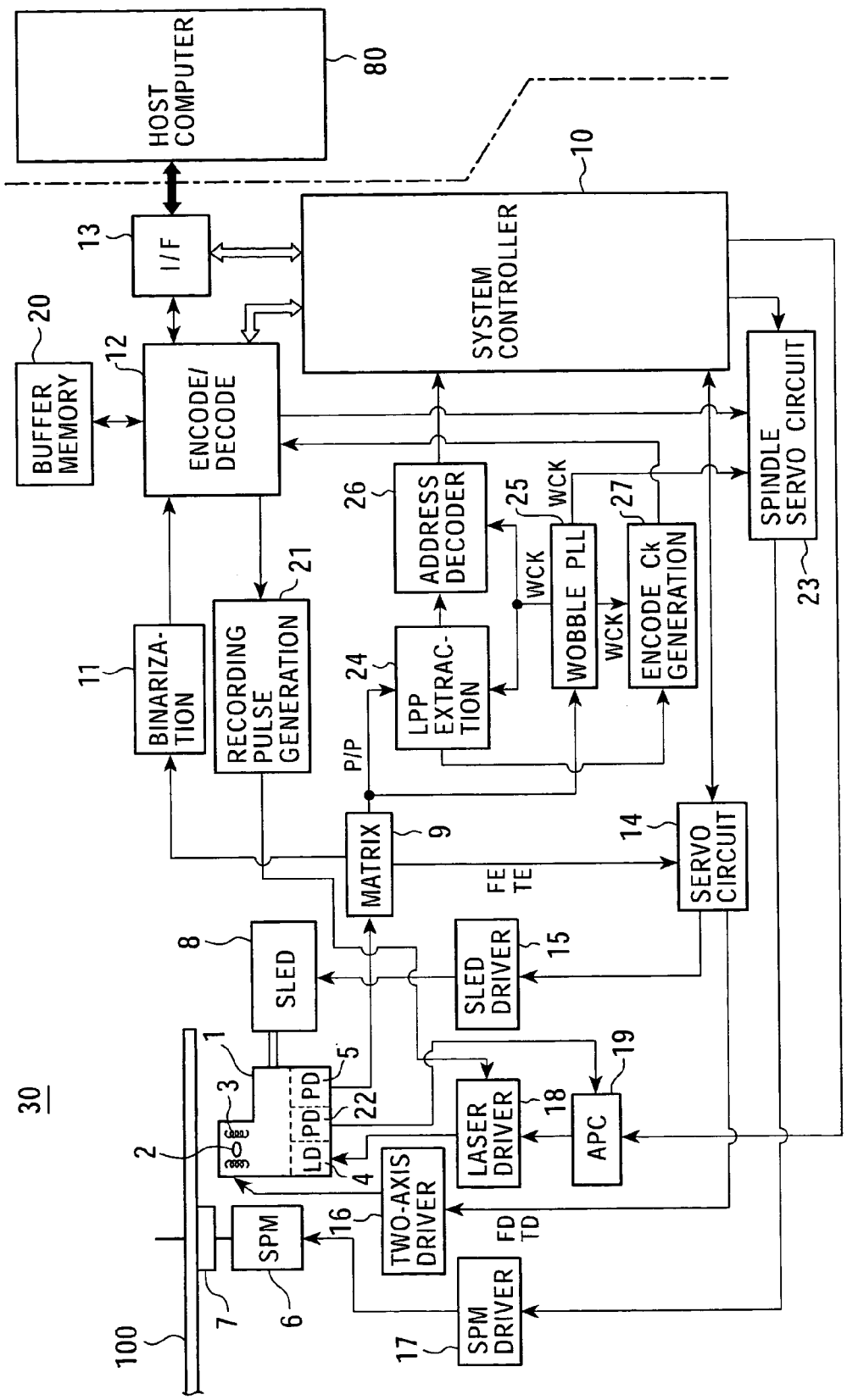
FIG. 1 is a block diagram of a disk drive device according to an embodiment of the present invention.

FIG. 1 shows the configuration of a disk drive device 30 of this example.

A disk 100 as a DVD-R or a DVD-RW is placed on a turntable 7, and is rotationally driven by a spindle motor 6 at a constant linear velocity (CLV) during a recording/playback operation. Then, an optical pickup 1 reads pit data recorded on tracks (groove tracks) on the disk 100, wobbling information of tracks, and land prepit information. The pits recorded as data on tracks formed as grooves are so-called pigment change pits or phase change pits.

Inside the pickup 1, a laser diode 4 serving as a laser light source; a photodetector 5 for detecting reflected light; an objective lens 2, which becomes the output end of the laser light; and an optical system (not shown) for radiating laser light onto the disk recording surface via the objective lens 2 and for guiding reflected light therefrom to the photodetector 5 are formed.

A monitoring detector 22 for receiving a part of the output light from the laser diode 4 is also disposed.

The laser diode 4 outputs laser light having a wavelength of 650 or 635 nm. The NA of the optical system is 0.6.

The objective lens 2 is movably supported in the tracking direction and in the focusing direction by means of a two-axis mechanism 3.

The entire pickup 1 is movable in the radial direction of the disk by a sled mechanism 8.

The laser diode 4 in the pickup 1 is driven to emit laser light in accordance with a drive signal (drive current) from a laser driver 18.

The reflected light information from the disk 100 is detected by the photodetector 5, is formed as an electrical signal corresponding to the amount of received light, and is supplied to a matrix circuit 9.

The matrix circuit 9 includes a current-to-voltage conversion circuit, a matrix computation/amplification circuit, etc., in such a manner as to correspond to output current from a plurality of photoreceiving elements as the photodetector 5, and generates necessary signals by a matrix computation process.

For example, an RF signal corresponding to playback data, a focusing error signal, a tracking error signal, etc., for servo control are generated.

Furthermore, as a signal related to land prepits and wobbling of grooves, a push-pull signal P/P is generated. The push-pull signal is also used as a tracking error signal.

The RF signal output from the matrix circuit 9 is supplied to a binarization circuit 11. The focusing error signal FE and the tracking error signal TE are supplied to a servo circuit 14. The push-pull signal P/P is supplied to a land prepit extraction section 24 and a wobble PLL 25.

The push-pull signal P/P is binarized at the land-prepit extraction section 24, and is supplied as land prepit information to an address decoder 26, whereby address information preformated by an address decoder 26 is decoded. The decoded address information is supplied to a system controller 10.

Furthermore, from the push-pull signal P/P, a wobble clock WCK is generated by a PLL operation at the wobble PLL 25. This wobble clock WCK is supplied to an encoding clock generation section 27, the land-prepit extraction section 24, the address decoder 26, and a spindle servo circuit 23.

The RF signal obtained at the matrix circuit 9 is binarized at the binarization circuit 11, after which the signal is supplied to an encoding/decoding section 12.

The encoding/decoding section 12 includes a part functioning as a decoder during playback, and a part functioning as an encoder during recording.

During playback, as decoding processes, a run-length limited code demodulation process, an error correction process, a deinterleaving process, etc., are performed to obtain playback data.

Furthermore, during playback, the encoding/decoding section 12 causes a playback clock synchronized with the RF signal to be generated by a PLL process, and performs the above-described decoding processes in accordance with the playback clock.

During playback, the encoding/decoding section 12 stores the data decoded in the above-described manner in a buffer memory 20.

As playback output from the disk drive device 30, the data buffered in the buffer memory 20 is read, and is then transferred and output.

An interface section 13, which is connected to an external host computer 80, performs communication of recording data, playback data, and various kinds of commands to and from the host computer 80.

Then, during playback, the playback data, which is decoded and stored in the buffer memory 20, is transferred and output to the host computer 80 via the interface section 13.

A read command, a write command, and other signals are supplied to the system controller 10 via the interface section 13.

On the other hand, during recording, recording data is transferred from the host computer 80. The recording data is sent from the interface section 13 to the buffer memory 20, where the recording data is buffered.

In this case, as processes for encoding buffered recording data, the encoding/decoding section 12 performs encoding, such as addition of an error correction code, interleaving, addition of subcodes, and modulation of run-length limited codes of recording data on the disk 100.

During recording, an encoding clock serving as a reference clock for an encoding process is generated at the encoding clock generation section 27, and the encoding/decoding section 12 performs an encoding process by using this encoding clock.

The encoding clock generation section 27 generates an encoding clock from the wobble clock WCK supplied from the wobble PLL 25 and the land prepit information supplied from the land prepit extraction section 24.

The recording data generated by the encoding process at the encoding/decoding section 12 is converted into recording pulses (laser-driven pulses) at a recording pulse generation section 21, and is sent to the laser driver 18.

In the recording pulse generation section 21, recording compensation, that is, fine adjustment of optimum recording power and adjustment of the laser driving pulse waveform with respect to the characteristics of a recording layer, the spot shape of the laser light, the recording linear velocity, etc., is also performed.

In the laser driver 18, driving current based on the supplied laser driving pulse is supplied to the laser diode 4, whereby laser light-emission driving is performed. As a result, pits (pigment change pits or phase change pits) corresponding to the recording data are formed on the disk 100.

An APC (Automatic Power Control) circuit 19 is a circuit section for performing control so that the output of the laser becomes constant regardless of temperature, etc., while monitoring the laser output power in accordance with the output of a monitoring detector 22. The target value of the laser output is supplied from the system controller 10, and the laser driver 18 is controlled so that the laser output level becomes the target value.

The servo circuit 14 generates various types of servo driving signals for focusing, tracking, and the sled from the focusing error signal FE and the tracking error signal TE from the matrix circuit 9, so that a servo operation is performed.

More specifically, a focusing driving signal FD and a tracking driving signal TD are generated in such a manner as to correspond to the focusing error signal FE and the tracking error signal TE, and these signals are supplied to a two-axis driver 16. The two-axis driver 16 drives the focusing coil and the tracking coil of the two-axis mechanism 3 in the optical pickup 1. As a result, a tracking servo loop and a focusing servo loop formed by the pickup 1, the matrix circuit 9, the servo circuit 14, the two-axis driver 16, and the two-axis mechanism 3 are formed.

Furthermore, the servo circuit 14 turns off the tracking servo loop in accordance with the track jumping instruction from the system controller 10 and outputs a jumping driving signal to the two-axis driver 16, so that a track jumping operation is performed.

Furthermore, the servo circuit 14 generates a sled driving signal in accordance with a sled error signal obtained as a low-frequency component of the tracking error signal TE and access execution control from the system controller 10, and supplies the sled driving signal to a sled driver 15. The sled driver 15 drives the sled mechanism 8 in accordance with the sled driving signal. The sled mechanism 8 has a mechanism formed of a main shaft for supporting the pickup 1, a sled motor, transmission gears, etc., (not shown), and as a result of the sled driver 15 driving the sled mechanism 8 in accordance with the sled driving signal, a predetermined sliding movement of the pickup 1 is performed.

The spindle servo circuit 23 performs control for rotating the spindle motor 6 at a CLV.

The spindle servo circuit 23, during data recording, obtains the wobble clock WCK generated at the wobble PLL as information on the current rotational velocity of the spindle motor 6, and generates a spindle error signal SPE by comparing this information with predetermined CLV reference velocity information.

During data playback, a playback clock (clock which becomes a reference for a decoding process) generated by the PLL within the encoding/decoding section 12 becomes the current rotational velocity information of the spindle motor 6. Therefore, by comparing this information with the predetermined CLV reference velocity information, the spindle error signal SPE is generated.

Then, the spindle servo circuit 23 supplies to a spindle motor driver 17 a spindle driving signal generated in such a manner as to correspond to the spindle error signal SPE. The spindle motor driver 17 applies, for example, a three-phase driving signal to the spindle motor 6 in accordance with the spindle driving signal, so that CLV rotation of the spindle motor 6 is performed.

Furthermore, the spindle servo circuit 23 generates a spindle driving signal in accordance with a spindle kick/brake control signal from the system controller 10, so that operations such as starting, stopping, acceleration, deceleration, etc., of the spindle motor 6 are performed by the spindle motor driver 17.

Various kinds of operations of the servo system and the recording/playback system such as those described above are controlled by the system controller 10, which is formed by a microcomputer.

The system controller 10 performs various kinds of processes in accordance with commands from the host computer 80.

For example, when a read command for requesting transfer of certain data recorded on the disk 100 is supplied from the host computer 80, first, seeking operation control is performed with the specified address being an object. That is, an instruction is issued to the servo circuit 14, so that an access operation of the pickup 1 with the address specified by the seeking command being a target is performed.

Thereafter, operation control required to transfer the data in that specified data interval to the host computer 80 is performed. That is, reading of data from the disk 100, decoding, buffering, etc., are performed, and then the requested data is transferred.

When a write command is issued from the host computer 80, the system controller 10 moves the pickup 1 to the address at which writing should be performed. Then, the encoding/decoding section 12 performs an encoding process on the data transferred from the host computer 80 in the above-described manner.

Then, as a result of a laser driving pulse from the recording pulse generation section 21 being supplied to the laser driver 18 in the above-described manner, recording is performed.

The operation during playback and the operation during recording in the disk drive device 30 are summarized as follows.

<Operation during Playback>

Servo Operation

The signal detected by the pickup 1 is converted into servo error signals, such as a focusing error signal FE and a tracking error signal TE, at the matrix circuit 9, and is sent to the servo circuit 14. The driving signals FD and TD output from the servo circuit 14 drive the two-axis mechanism 3 of the pickup 1 so that focusing servo and tracking servo are performed.

Data Playback

The signal detected by the pickup 1 is converted into an RF signal at the matrix circuit 9, and is sent to the encoding/decoding section 12. In the encoding/decoding section 12, a channel clock is reproduced, and decoding is performed in accordance with the channel clock. The decoded data is sent to the interface section 13.

Rotation Control

The rotation of the disk 100 is controlled by sending the channel clock reproduced at the encoding/decoding section 12 to the spindle servo circuit 23.

Address Reproduction

The address, which is contained in the RF signal, is decoded at the encoding/decoding section 12 and is sent to the system controller 10.

However, during seeking, the address recorded by the land prepit is extracted so that movement control toward the target position is performed.

Laser Control

The APC circuit 19 performs control in accordance with instructions from the system controller 10 so that the laser output is maintained constant.

<Operation during Recording>

Servo Operation

This is performed in the same manner as during playback. Correction is performed at the matrix circuit 9 or the servo circuit 14 so that the gain does not increase due to an increase in the laser power.

Data Recording

For the data acquired through the interface section 13, channel coding, such as addition of an ECC, rearrangement, and modulation, is performed at the encoding/decoding section 12. The data subjected to channel coding is converted into laser driving pulses suitable for the disk 100 at the recording pulse generation section 21, and is applied to the laser diode 4 within the pickup 1 through the laser driver 18 (the APC circuit 19).

Rotation Control

The push-pull signal P/P output from the matrix circuit 9 is formed as a wobble clock WCK at the wobble PLL, and is applied to the spindle servo circuit 23, so that constant linear velocity (CLV) rotation control is performed.

Address Reproduction

The push-pull signal P/P output from the matrix circuit 9 is sent to the land prepit extraction section 24, whereby land prepit information is detected. The detected land prepit information is decoded into an address value at the address decoder 26 and is read at the system controller 10.

The land prepit information is also sent to the encoding clock generation section 27, whereby an encoding clock is reproduced and is applied to the encoding/decoding section 12.

In the example of FIG. 1, the disk drive device 30 connected to the host computer 80 is shown. However, as a disk drive device of the present invention, a form in which the disk drive device is not connected to the host computer 80 is possible. In that case, an operation section and a display section are provided, and the configuration of interface parts for data input and output differs from the configuration of FIG. 1. That is, recording and playback need only be performed in accordance with an operation of a user, and terminal sections for input and output of various kinds of data need only be formed.

Next, a description will be given, with reference to FIGS. 2, and 3A to 3D, of the configuration and the operation for detecting address information recorded as land prepits on a disk in the disk drive device 30.

Figure 2:
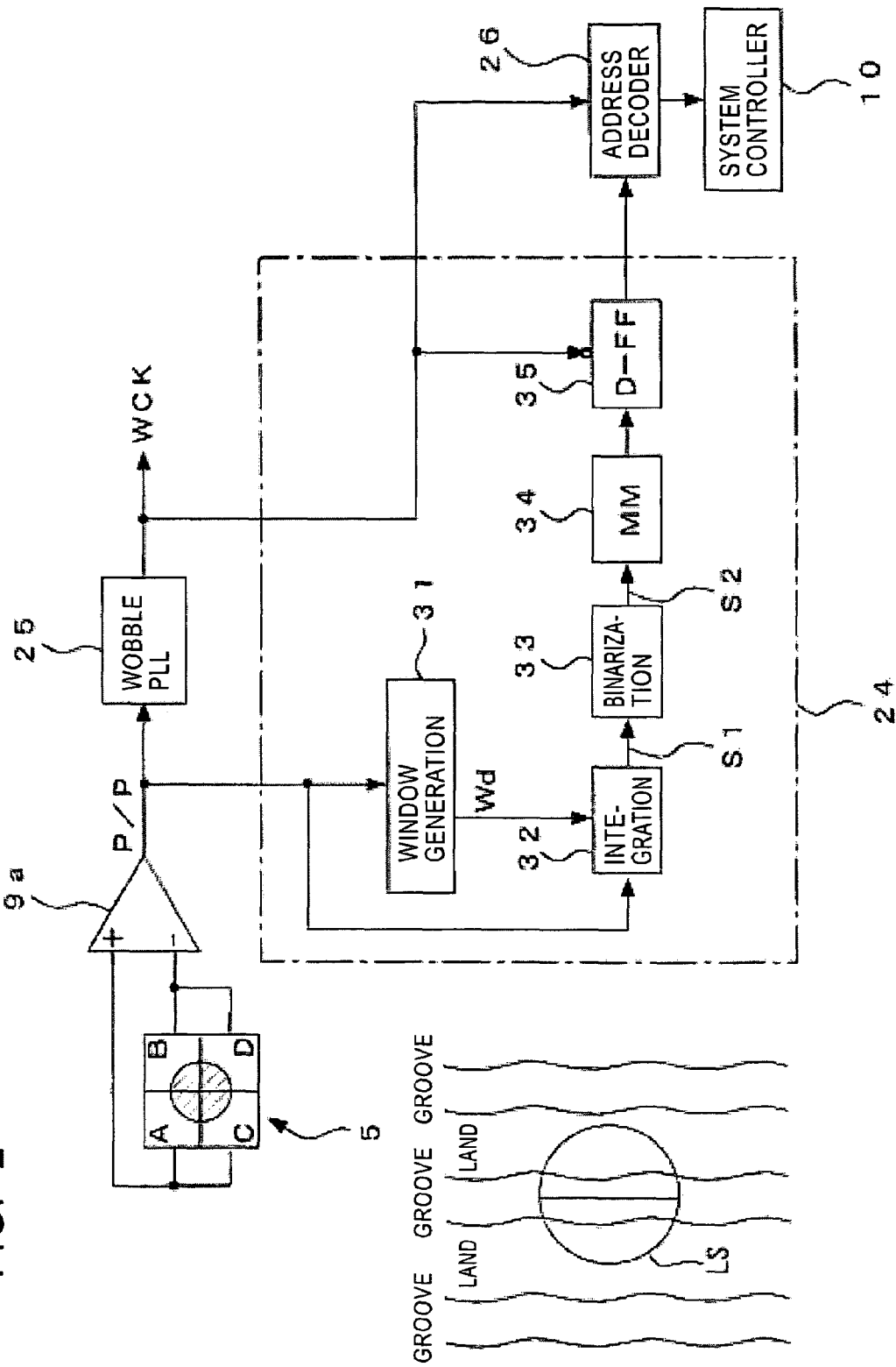
FIG. 2 is a block diagram of a configuration for extracting an address recorded by land prepits of the disk drive device according to the embodiment.

In FIG. 2, as components for detecting land prepits, the photodetector 5 within the pickup 1, a differential amplifier 9a in the matrix circuit 9, the land prepit extraction section 24, the wobble PLL 25, the address decoder 26, and the system controller 10 are shown.

In the matrix circuit 9, only the differential amplifier 9a for generating the push-pull signal P/P is shown, and the illustration and the descriptions of circuit components for generating the above-described RF signal, focusing error signal FE, tracking error signal TE, etc., are omitted.

The photodetector 5, as shown in the figure, is formed as a quadrant detector made up of photoreceiving sections A, B, C, and D. In practice, each of the reflected light beams (electrical current corresponding to the amount of received light) detected by each photoreceiving section is converted into current/voltage. Furthermore, signals A, B, C, and D, which are formed as voltage values, are subjected to computations, generating predetermined signals of the focusing error signal FE, the push-pull signal P/P, etc. Here, a signal for generating the push-pull signal P/P will be described.

The signal for obtaining the push-pull signal P/P becomes an amount of reflected light signal corresponding to the left half of a laser spot LS in the figure with respect to the direction of the track lines, and an amount of reflected light signal corresponding to the right half thereof when the laser spot LS is radiated onto the tracks, as shown in the figure. That is, a signal B+D is subtracted from a signal A+C at the differential amplifier 9a, generating the push-pull signal P/P. The signal A+C is such that the electrical currents obtained at the photoreceiving sections A and C are converted into voltages, and are added together. The signal B+D is such that the electrical currents obtained at the photoreceiving sections B and D are converted into voltages, and are added together.

As also described with reference to FIG. 1, the push-pull signal P/P is supplied to the wobble PLL 25, whereby a wobble clock WCK synchronized with a wobbling groove is generated.

Furthermore, the push-pull signal P/P is supplied to the land prepit extraction section 24.

The land prepit extraction section 24 includes a window generation circuit 31, an integration circuit 32, a binarization circuit 33, a mono-multivibrator 34, and a D flip-flop 35.

The window generation circuit 31 binarizes the push-pull signal P/P by using a predetermined threshold level th1, and outputs the binarized signal as a window signal Wd to the integration circuit 32.

Figure 3A:
FIGS. 3A to 3D are illustrations of a signal waveform in address extraction steps by land prepits according to the embodiment.

FIG. 3A shows, in particular, an amplitude waveform formed by land prepits as the push-pull signal P/P in an area where data is recorded in groove tracks.

Figure 3B:

As a result of the push-pull signal P/P being binarized by being compared with the threshold level th1, a window signal Wd such as that shown in FIG. 3B is generated. This window signal Wd becomes a signal indicating a period in which there is an amplitude formed by the land prepits.

The integration circuit 32 is configured in such a way that integration of the input push-pull signal P/P is performed only in a period in which the window signal Wd is active, and when the window signal Wd is closed, the integration is reset.

Figure 3C:
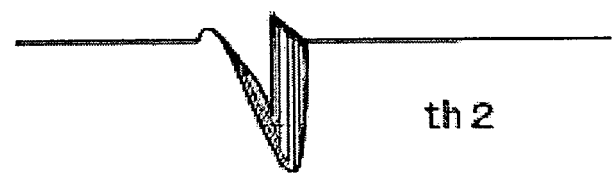

Therefore, an integrated output signal S1 of the integration circuit 32 becomes as shown in FIG. 3C; that is, it becomes a signal such that the push-pull signal P/P is integrated in an amplitude period by the land prepits.

Figure 3D:
Figure 4:
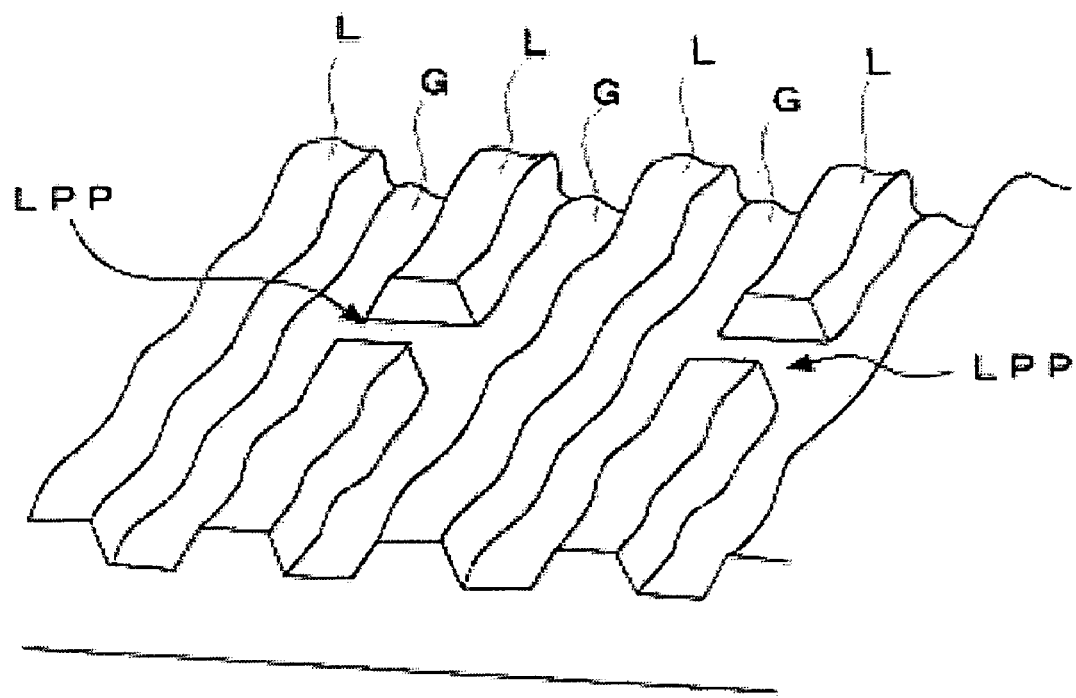
FIG. 4 is an illustration of a disk on which land prepits are formed.

The output signal S1 of the integration circuit 32 is binarized by a predetermined threshold level th2 at the binarization circuit 33. An output signal S2 of the binarization circuit 33 becomes as shown in FIG. 3D.

The output signal S2 of the binarization circuit 33 is extended in the time direction at the mono-multivibrator 34, and is supplied to the D flip-flop 35. Then, the D flip-flop 35 latches and outputs the signal at the fall of the wobble clock WCK.

Figure 5A:
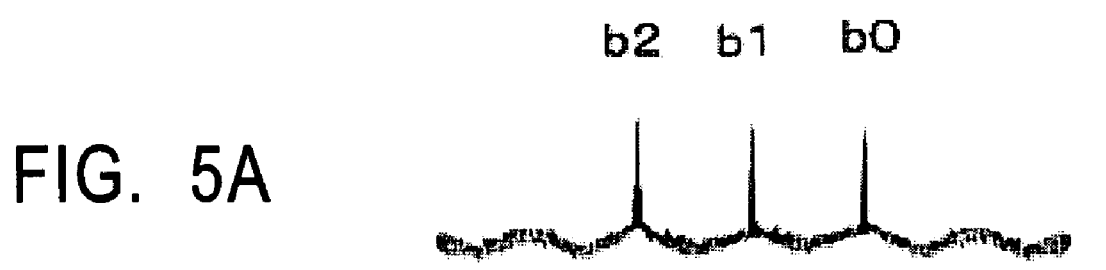
FIGS. 5A to 5C are illustrations of the waveform of a land prepit signal.
Figure 5B:
Figure 5C:

The output of the D flip-flop 35 becomes information of the land prepits b2, b1, and b0, described with reference to FIGS. 5A to 5C, and this is supplied to the address decoder 26.

Figure 6:
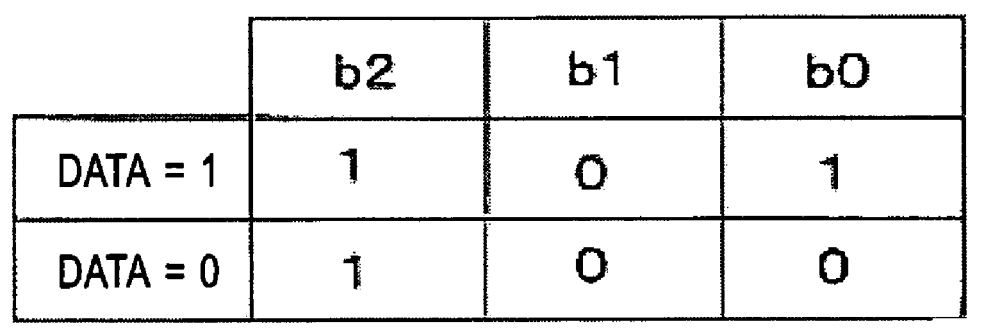

The address decoder 26 detects a data pattern of FIG. 6 from the information b2, b1, and b0 in order to extract "1" or "0", and performs decoding, error correction, etc., of the address information from the data sequence. As a result, the extracted address information is sent to the system controller 10.

As described above, in this example, the push-pull signal P/P is integrated in the amplitude period of the land prepits, and the information of the land prepits is extracted from the integrated output signal S1.

In the manner described above, after data is recorded on the groove tracks, satisfactory address detection cannot be performed because the amplitude based on the land prepits is disturbed in the push-pull signal P/P. In contrast, in this example, by integrating the push-pull signal P/P, a sharp amplitude waveform corresponding to the land prepits is obtained, and by binarizing the integrated signal, information of the land prepits is obtained. As a result, even when data is recorded on the groove tracks, the land prepits can be accurately detected, and therefore, the address information recorded by the land prepits can be read stably.

The fact that, even after data is recorded, the address information recorded by the land prepits can be read stably means that an address can be accurately read during additional recording and seeking for the recorded disk. This makes it possible to realize a stable operation.

In the foregoing, the disk drive device of the embodiment has been described. The present invention is not limited to these examples, and various modifications are possible within the scope of the subject matter.

As can be understood from the above description, according to the present invention, a land prepit detection period is specified by a window signal obtained by binarizing the push-pull signal, the push-pull signal is integrated in that period, and the address information by the land prepits is obtained from the integrated result. In this case, since the integrated signal of the push-pull signal becomes a sharp waveform corresponding to the land prepits, there is the advantage that, even after data is recorded on the groove tracks, the address information recorded by the land prepits can be read stably. Furthermore, additional recording and a seeking operation on the recorded disk also become stable. Thus, device performance is improved.

Furthermore, there is no need to use an expensive pickup with high accuracy, and the present invention is suitable from a cost standpoint.

The invention claimed is:

1. A disk drive device comprising:
head means for performing laser output for the purpose of recording or playing back data to or from a disk-shaped recording medium on which grooves are formed as recording tracks and address information is recorded by prepits on lands between the grooves;
push-pull signal generation means for generating a push-pull signal from reflected light information detected by said head means;
window generation means for generating a window signal by binarizing said push-pull signal by using a first threshold level;
integration means for integrating said push-pull signal only in a period in which the window signal is active; and
extraction means for extracting address, information recorded by said prepits from the output of said integration means,
wherein said extraction means comprises,
a binarization circuit for binarizing an output of said integration means on a basis of a second threshold level,
a mono-multivibrator for extending an output signal of the binarization circuit in a time direction, and
a flip-flop for latching an output of the mono-multivibrator in accordance with a predetermined clock.

2. An address detection method for detecting address information recorded by prepits with respect to a disk-shaped recording medium on which grooves are formed as recording tracks and address information is recorded by said prepits on lands between grooves, said address detection method comprising the steps of:
generating a push-pull signal from reflected light information when laser radiation is performed on said disk-shaped recording medium;
generating a window signal by binarizing said push-pull signal by using a first threshold level;
integrating said push-pull signal only in a period in which the window signal is active; and
extracting address information recorded by said prepits from said integrated signal,
wherein said address information is extracted in such a manner that an output of an integrating means is binarized on a basis of a second threshold level, and
said address information is extracted in such a manner that a binarized output signal is extended in a time direction, and the extended signal is latched in accordance with a predetermined clock.

3. A disk drive device comprising:
a head circuit configured to perform laser output for the purpose of recording or playing back data to or from a disk-shaped recording medium on which grooves are formed as recording tracks and address information is recorded by prepits on lands between the grooves;
a push-pull signal generation circuit configured to generate a push-pull signal from reflected light information detected by said head circuit;
a window generation circuit configured to generate a window signal by binarizing said push-pull signal by using a first threshold level;
an integration circuit configured to integrate said push-pull signal only in a period in which the window signal is active; and
an extraction circuit configured to extract address information recorded by said prepits from the output of said integration circuit,
wherein said extraction circuit comprises:
a binarization circuit for binarizing an output of said integration circuit based on a second threshold level,
a mono-multivibrator configured to extend an output signal of the binarization circuit in a time direction, and
a flip-flop configured to latch an output of the mono-multivibrator in accordance with a predetermined clock.

* * * * *